United States Patent [19]
Yafuso et al.

[11] Patent Number: 5,912,882
[45] Date of Patent: Jun. 15, 1999

[54] METHOD AND APPARATUS FOR PROVIDING A PRIVATE COMMUNICATION SYSTEM IN A PUBLIC SWITCHED TELEPHONE NETWORK

[75] Inventors: Byron Y. Yafuso, San Diego; Matthew S. Grob, La Jolla; Eric J. Lekven, Carlsbad; Steven L. Rogers, San Diego, all of Calif.

[73] Assignee: Qualcomm Incorporated, San Diego, Calif.

[21] Appl. No.: 08/595,566

[22] Filed: Feb. 1, 1996

[51] Int. Cl.$^6$ ...................................................... H04L 12/18
[52] U.S. Cl. ............................ 370/270; 370/441; 379/202
[58] Field of Search ..................................... 370/356, 358, 370/367, 372, 375, 380, 389, 395, 378, 310, 312, 319, 320, 323, 335, 342, 341, 347, 346, 349, 442, 411, 422, 351, 352, 353, 354, 357, 360, 390; 379/94–98, 93.09, 93.15, 219, 220, 225, 232, 242, 248, 202, 207; 340/825.79; 455/403, 416, 422, 439, 516, 517, 518, 524, 553, 554, 555, 560

[56] References Cited

U.S. PATENT DOCUMENTS

| | | | |
|---|---|---|---|
| 5,119,375 | 6/1992 | Paneth et al. | 370/521 |
| 5,121,391 | 6/1992 | Paneth et al. | 455/33.1 |
| 5,410,728 | 4/1995 | Bertiger et al. | 455/13.1 |
| 5,420,852 | 5/1995 | Anderson et al. | 370/364 |
| 5,465,391 | 11/1995 | Toyryla | 455/33.4 |
| 5,544,161 | 8/1996 | Bigham et al. | 370/474 |

*Primary Examiner*—Dang Ton
*Attorney, Agent, or Firm*—Russell B. Miller; Thomas M. Thibault

[57] ABSTRACT

A private communication network through which a plurality of member users communicate using the public switched telephone network (PSTN) is disclosed herein. Each member user utilizes either a modified land line telephone directly connected to PSTN, or uses a modified mobile telephone operatively coupled to the PSTN through a wireless communication system. The private communication network includes network call manager having a telephone network interface for establishing a telephone connection with each of a plurality of telephone lines of the PSTN. Each of the plurality of telephone lines is associated with one of the plurality of member users. The network call manager further includes a switch matrix, coupled to the telephone network interface, for providing an information signal received from an active member user over a selected telephone line to the remaining non-active member users. A network call manager controller identifies the active member user the basis of push-to-talk (PTT) request signals received from the member users' telephones over the plurality of telephone lines. The telephone set of each member user will typically be capable of both standard telephone operation as well as of PTT operation over the private communication network. The security of the PTT private network may be enhanced by configuring each telephone set for encryption of all such reverse link transmissions, as well as for corresponding decryption of the forward link information from the active member user.

22 Claims, 8 Drawing Sheets

METHOD AND APPARATUS FOR PROVIDING A PRIVATE COMMUNICATION SYSTEM IN A PUBLIC SWITCHED TELEPHONE NETWORK

BACKGROUND OF THE INVENTION

I. Field of the Invention

The present invention relates generally to multiparty communication systems, and, more particularly, to a point-to-multipoint private communication network directly incorporated within a cellular or land line telephone system.

II. Description of the Related Art

Mobile cellular telephone service has been in use for some time, and traditionally has been characterized by a central site transmitting with high power to a limited number of mobile or portable units in a large geographic area. In early cellular systems only a limited number of radio channels were available, thus limiting the number of radiotelephone conversations within an entire metropolitan area to the number of channels available.

Modern cellular radiotelephone systems have a comparatively large number of radio channels, which may be effectively multiplied by using identical channel frequencies within the differing smaller coverage areas (i.e., "cells") comprising a given service territory. Each cell includes a cell-site transmitter, or base station, which broadcasts at a power level selected to ensure signal reception at the cell boundary without unduly interfering with reception in adjacent cells. This allows channel frequencies used in one cell to be reused in another cell geographically separated therefrom according to a predetermined plan. Thus, a large number of channels can be made available in a metropolitan area and the service provided thereby can be identical to a standard wire line telephone.

Numerous standards exist for the implementation of cellular telephone communications. These standards include the advanced mobile phone system (AMPS), Global System for Mobile communication (GSM), and Code Division Multiple Access (CDMA). The spread spectrum modulation technique of CDMA has significant advantages over other modulation techniques for multiple access communication systems. For example, the use of CDMA results in a much higher spectral efficiency than can be achieved using other multiple access schemes.

Although recent development efforts have enabled CDMA and other cellular systems to effectively provide "point-to-point" communication links between users, various public and private agencies have nonetheless continued to rely upon dedicated land mobile radio (LMR) communication networks. This results from the incapability of cellular systems to establish "point-to-multipoint" communication networks among a set of member users. For example, local law-enforcement agencies utilize LMR networks in which a closed radio communication system is established through repeater stations. Such closed LMR networks are often characterized by push-to-talk (PTT) operation, in which users depress a handset talk button or the like when desiring to broadcast voice information to other member users. However, the infeasibility of providing repeater stations over a large geographic area limits the extent to which the set of member users may be geographically dispersed.

Although both cellular and conventional land line telephone systems are capable of facilitating communication between widely separated users, closed "PTT-type" communication networks have not hitherto been incorporated within either type of system. This may be due in part to the absence of a convenient mechanism for automatically joining an identified set of users into such a closed network. Moreover, even if such a mechanism were available, both types of systems are easily compromised by unauthorized third parties and are thus unsuitable for secure communication.

The conference calling capability provided by both cellular and land line carriers is also an unsuitable surrogate for a PTT-type communication network. In particular, conference calling between users within different cellular or land line systems requires some degree of prior coordination with the responsible service provider. Moreover, in many conference calling systems the information signals from the conference call participant are combined and the resultant composite signal universally provided to each such participant. This effectively precludes separately encrypting each such information signal as a means of increasing communication security, since the separately encrypted information signals would generally not be recoverable from the composite signal.

Accordingly, it is an object of the present invention to incorporate a private communication network directly within a cellular and/or land line telephone system in such a way as to obviate the need for prior coordination with a telephone service provider.

It is another object of the invention that the private communication network emulate an LMR network characterized by PTT operation.

It is yet another object of the present invention that control of the private communication network be resident within a network call manager separately connected to an existing land line telephone system.

It is a further object of the present invention that encryption techniques be capable of application within the private communication network as a means of enhancing communication security.

SUMMARY OF THE INVENTION

The present invention is directed to a private communication network through which a plurality of member users communicate using the public switched telephone network (PSTN). Each member user utilizes either a modified land line telephone directly connected to the PSTN, or uses a modified mobile telephone operatively coupled to the PSTN through a wireless communication system. The private communication network includes a network call manager having a telephone network interface for establishing a telephone connection with each of a plurality of telephone lines of the PSTN. Each of the plurality of telephone lines is associated with one of the plurality of member users.

The network call manager further includes a telephone line switch matrix, coupled to the telephone network interface, for providing an information signal received from an active member user over a selected telephone line to the remaining non-active member users. A network manager controller identifies the active member user the basis of push-to-talk (PTT) request signals received from the member users' telephones over the plurality of telephone lines. The active member user may be identified as, for example, the member user from which a PTT request signal is first received after the previously active member user has relinquished speaking privileges. Alternately, the active member user may be chosen by using predefined user priority criteria to evaluate all PTT request signals queued by the network call manager.

The telephone set of each member user will typically be capable of both standard telephone operation, and of PTT operation over the private communication network. When configured for PTT operation, each telephone set receives and digitally processes input voice or data information from a member user. The resultant vocoder data packets, as well as any PTT request signals initiated by the member user, are then supplied to a modem for reverse link transmission via the PSTN to the telephone network interface of the network call manager. The security of the PTT private network may be enhanced by configuring each telephone set for encryption of all such reverse link transmissions, as well as for corresponding decryption of the forward link information from the active member user.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE PREFERRED EMBODIMENTS

I. Structure of PTT Private Network

Figure 1:
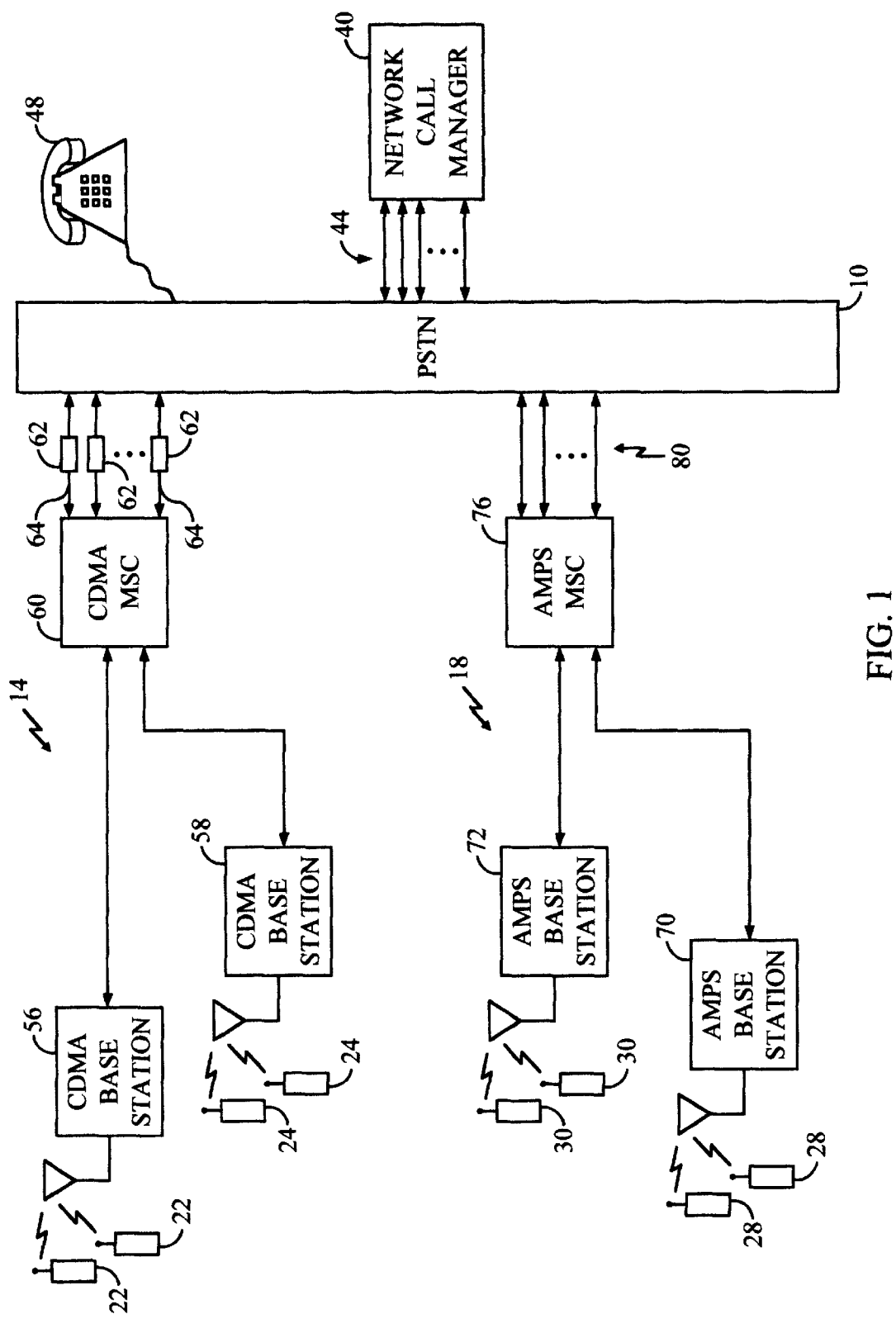
FIG. 1 illustratively represents the elements of an exemplary telephone system within which may be established a PTT point-to-multipoint private communication network of the present invention.

FIG. 1 illustratively represents the elements of an exemplary telephone system within which may be established a PTT point-to-multipoint private communication network ("PTT private network") of the present invention. Referring to FIG. 1, the exemplary telephone system includes a public switched telephone network (PSTN) 10, a CDMA cellular communication system 14 and an analog (AMPS) cellular communication system 18. The CDMA system 14 provides service to CDMA-compatible mobile radiotelephones ("CDMA mobiles") 22 and 24, while the AMPS system 18 facilitates communication with users of AMPS-compatible mobile radiotelephones ("AMPS mobiles") 28 and 30. A network call manager 40, connected through a plurality of T1 channels 44 to the PSTN 10, operates as described hereinafter to create a private communication network among a corresponding plurality of member users within the exemplary telephone system of FIG. 1.

The private communication network may include member users serviced by one or both of the CDMA and AMPS cellular systems 14 and 18, and/or may include one or more member users directly connected to the PSTN 10 through modified land line telephones such as the telephone 48. Although CDMA and AMPS cellular systems are shown as being incorporated within the exemplary embodiment of FIG. 1, it is to be understood that the teachings of the present invention are pertinent to other cellular air interface standards as well for example Global System for Mobile Communications (GSM) and Time Division Multiple Access (TDMA). A brief description of the constituent elements of the CDMA and AMPS cellular communication systems 14 and 18 shown in FIG. 1 will be provided prior to discussion of the operative principles of the present invention.

The CDMA cellular communication system 14 includes a plurality of cells, two of which are identified in FIG. 1 as including cell-sites (i.e., "base stations") 56 and 58. Each cell may be partitioned into a number of sectors, where communication with CDMA mobiles 22 and 24 within a given sector is handled by a cell-site transceiver providing radio coverage over the sector. The base stations 56 and 58 operate to receive and transmit the signals enabling a radio transceiver within each CDMA mobile to communicate with the PSTN 10. In the CDMA system 14, data packets are used in the over-the-air exchange of information between the base stations 56 and 58 and the CDMA mobiles 22 and 24.

Telephone calls are routed by the cell-site base stations 56 and 58 between the CDMA mobiles 22 and 24 and a CDMA mobile switching center (MSC) 60, which will typically be located within a mobile telephone switching office (not shown). The primary purpose of the MSC 60 is to provide voice path connections between the CDMA mobiles 22 and 24 and the PSTN 10. To this end the MSC 60 performs functions such as, rating data between a MSC modems 62 and CDMA mobiles 22 and 24 by way of the appropriate CDMA base station 56 or 58. The MSC 60 also performs other tasks, including paging of a CDMA mobile when a call is received from the PSTN 10 and switching calls to available PSTN lines via a plurality of T1 channels 64. A set of MSC modems 62 serves to convert the digital information signals received from the CDMA mobiles 22 and 24 to analog signals suitable for transmission over the PSTN 10, and likewise converts analog signals from the PSTN 10 to digital signals subsequently provided to the CDMA mobiles 22 and 24.

The AMPS cellular communication system 18 also includes a number of cells, two of which are identified in FIG. 1 as including cell-site base stations 70 and 72. Each cell may be partitioned into a number sectors, where communication with AMPS mobiles 28 and 30 within a given sector is handled by a cell-site transceiver providing radio coverage over the sector. Telephone calls are routed by the cell-site base stations 70 and 72 between the AMPS mobiles 28 and 30 and an AMPS mobile switching center (MSC) 76, which is coupled to the PSTN 10 via a plurality of T1 channels 80.

II. Operation of PTT Private Network

Figure 2:
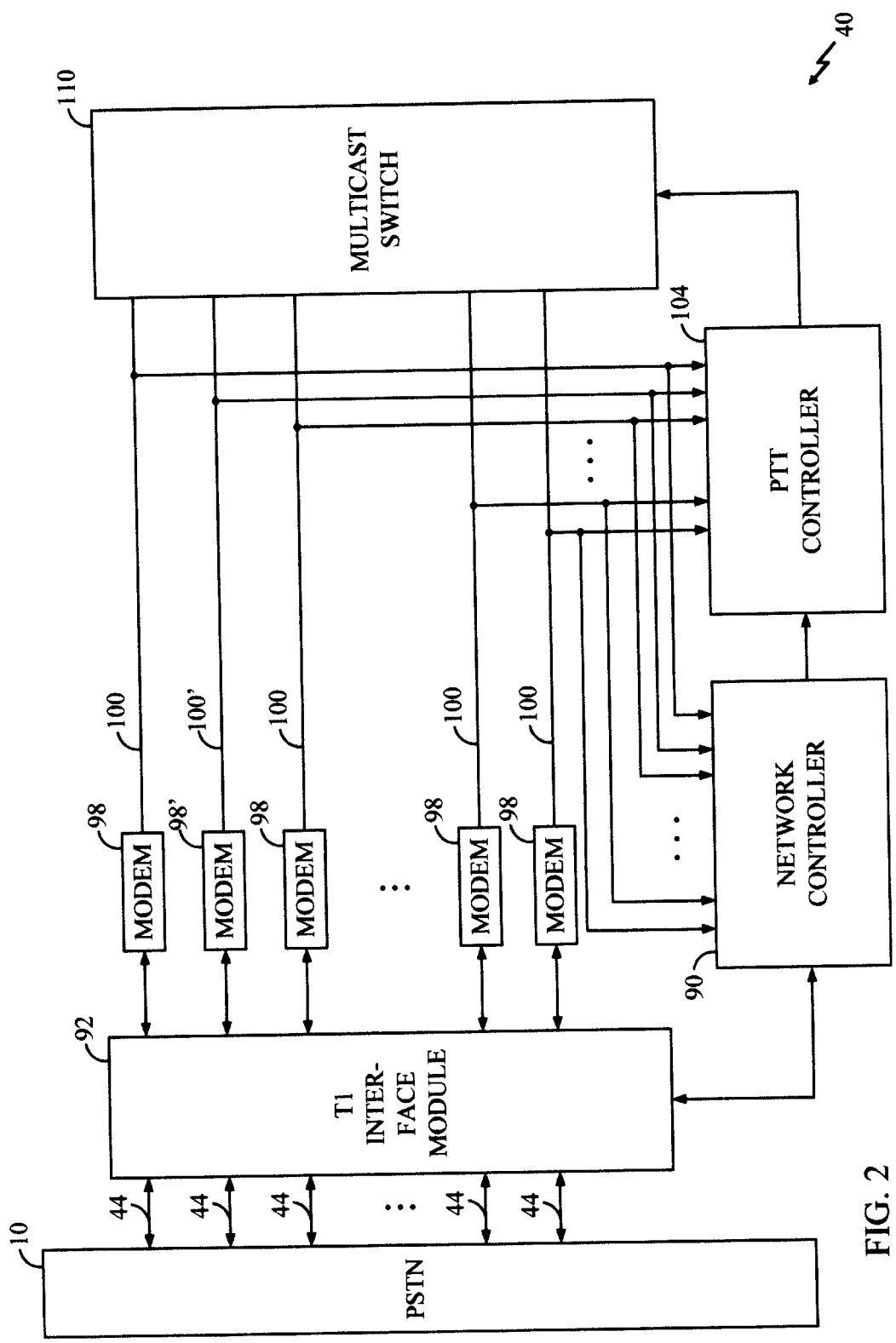
FIG. 2 is a block diagram of an exemplary network call manager of the PTT private network of the present invention.

Turning now to FIG. 2, reference will be made to a block diagram of an exemplary network call manager 40 in describing operation of the PTT private network of the present invention. The manner in which the land line or cellular telephones associated with each member user are configured for cooperation with the network call manager 40 will be described below with reference to FIGS. 3–5. In what follows, communication links from the modified land line telephone 48, from the AMPS mobiles 28 and 30, and from the CDMA mobiles 22 and 24, to the network call manager 40 via the PSTN 10 are termed "reverse links". The reverse link associated with the member user currently designated by the network call manager 40 as the active member user is assumed to be the only one of the reverse links carrying valid voice or data information. All other reverse links are available for use in providing signaling information to the network call manager 40. Each "forward link" through the PSTN 10 from the network call manager 40 to each member user carries the voice or data information provided by the active member user. As is described herein, the network call manager 40 is reconfigured upon each new identification of an active member. This reconfiguration results in the reverse link voice or data information from the newly identified active member user being provided to the forward links associated with all other member users, including the forward link of the previously active member user.

The network call manager 40 includes a network controller 90, within which is stored at least one list of the telephone numbers associated with the member users of a first PTT private network. When desiring to access the first PTT private network, a calling member user dials an access number identifying the first PTT private network. The network controller 90 may also store other lists of member users, each list being associated with a unique access number and defining a separate PTT private networks.

The network call manager 40 is designed to appear to the PSTN 10 as would a private branch exchange (PBX) system, and thus the call placed by the calling member user may be received over any one of the T1 channels 44. In this regard a telephone network (T1) interface 92 is provided for forming a connection between the T1 channel 44 associated with the calling member user and one of a plurality of network manager modems 98. As is described herein, the T1 interface 92 also serves to connect various other ones of the network manager modems 98 to ones of the T1 channels 44 associated with other member users.

If the calling member user is serviced by the CDMA cellular system 14, a telephone connection is established when the network call manager modem 98' coupled to the T1 channel 44 receiving the incoming call becomes synchronized with the one of the MSC modems 62 (FIG. 1) assigned to the call. For a calling member user having a land line telephone or AMPS cellular telephone, a similar telephone connection is established upon synchronization of an internal modem (FIGS. 3A and 4) within the member user's telephone and the network manager modem 98' receiving the incoming call. In an exemplary embodiment the network manager modems 98 comprise, for example, so-called "AMPS modems" especially well-suited for over-the-air information transfer.

Upon an incoming call to a PTT private network being received from a member user over one of the T1 channels 44, the T1 interface 92 uses standard techniques to determine the access number dialed during placement of the call. The dialed access number, which corresponds to a given PTT private network, is communicated by the T1 interface 92 to the network controller 90. The T1 interface also connects the T1 channel 44 associated with the calling member user to an available network manager modem (e.g., network manager modem 98'). Once modem synchronization has been achieved, the network controller 90 may require the calling user to furnish authentication information used for verification of the calling user's membership in the PTT private network identified as corresponding to the called access number. Upon confirmation of such membership, the network controller 90 may command either the T1 interface 92 or a selected network manager modem 98 to initiate paging of the remaining member users of the identified PTT private network. It is noted that in alternate embodiments the T1 interface 92 may comprise an E1 interface, or various other digital or "PBX-type" interfaces.

Upon a first of the other member users of the identified PTT private network answering a network page (i.e., a telephone call) issued by the calling network manager modems 98, or by the T1 interface 92, a modem synchronization process similar of the type described above again occurs. In particular, if the called member user is serviced by an AMPS or land line telephone, modem synchronization occurs between the modem internal to the called member user's telephone (FIGS. 3A and 4) and one of the network manager modems 98. If the called member user is serviced by the CDMA cellular system 14, modem synchronization occurs between the calling network manager modem 98 and one of the MSC modems 62 (FIG. 1). It is to be understood that the MSC modems 62 need not be physically proximate the MSC 60, but may be located elsewhere within the telephone system infrastructure.

When the calling network manager modem 98 achieves such synchronization, it produces a CONNECT signal which is detected by the network controller 90. The network controller 90 may then instruct the called network manager modem 98' to send a CONNECT signal to the member user originally dialing the access number of the identified PTT private network. The network controller may also periodically send each authenticated participating member user of the PTT private network a list, to be displayed at each authenticated user's phone, of the other current participating member users.

A PTT controller 104 is provided for according speaking or data transmission privileges among the two or more member users joined to the identified PTT private network. In particular, the PTT controller 104 is responsive to PTT request signals ("PTT requests") generated by the land line or cellular telephones associated with the member users of the identified PTT private network. Each PTT request is generated at a member user's telephone either in response to manual engagement of a PTT switch, or in response to detected voice activity of the member user. A PTT request from a given member user is detected by the modem 98 assigned thereto, which provides the PTT signal to the PTT controller 104.

In an exemplary embodiment the PTT controller 104 designates as the currently active member user the one from which the first PTT request is received subsequent to network speaking privileges being released by a previously active member user. Network speaking privileges are relinquished by the previously active member user, in the case of manual PTT signaling, upon releasing engagement of the PTT switch of the speaker's telephone. In the case of voice-activated PTT signaling, network speaking privileges are relinquished upon the occurrence of a pause of predetermined duration.

In an alternate embodiment, PTT requests received prior to relinquishment of network speaking privileges by the currently active member user are queued. When the currently active member user subsequently relinquishes network speaking privileges, the queued PTT requests are evaluated in accordance with predefined criteria to determine the next currently active member user. Such predefined criteria could include, for example, member user priority as well as order of receipt of the queued requests.

The network call manager 40 may employ yet other techniques for selecting a new active member user on the basis of the received PTT requests. For example, each member user of a given PTT private network may be assigned a relative level of priority within the network. In this case when a PTT request is received from a member user of higher priority than the currently active member user, the network call manager 40 preempts the currently active member user and grants network speaking privileges to the higher priority member user. It is also possible that each member user would be allowed to alter its priority within prescribed limits known to the network call manager 40 as a means of obtaining network speaking privileges under urgent circumstances.

After a new active member user has been identified by the PTT controller 104 on the basis of the received PTT requests, the PTT controller 104 configures a multicast switch 110 to accept the reverse link voice or data information exclusively from the modem 98 associated with the currently active member user. That is, the reverse link information from each of the other modems 98, each of which has been assigned to one of the remaining (i.e., non-active) member users, is ignored by the multicast switch 110. The PTT controller also configures the multicast switch 110 to provide the reverse link information accepted from the newly identified active member user to the modems 98 associated with each non-active member user. Because PTT requests are transmitted only on the reverse links of non-active member users, such PTT requests advantageously do not interfere with the receipt of reverse link information from the active member user.

Although the forward links of each PTT private network are nominally used to carry voice or data information from the active member user to all other member users, the network controller 104 may also transmit system status information over the forward links during pauses or gaps in information transmission by the active member user. In an exemplary embodiment this system status information includes the following:

(i) eligible member users (phone number, name, priority) of a given PTT private network, (ii) member users (phone number, name, priority) currently joined to the given PTT private network, (iii) the currently active member user (phone number, name, priority), and (iv) the queue of member users (phone number, name, priority, order of request) who have provided PTT requests to the PTT controller 90.

This network status information is received and displayed by the telephones associated with the member users. The following section provides a description of particular implementation of PTT dual-mode telephones suitable for use within a PTT private network of the invention.

III. Land Line and Cellular PTT Dual-Mode Telephones

Figure 3A:
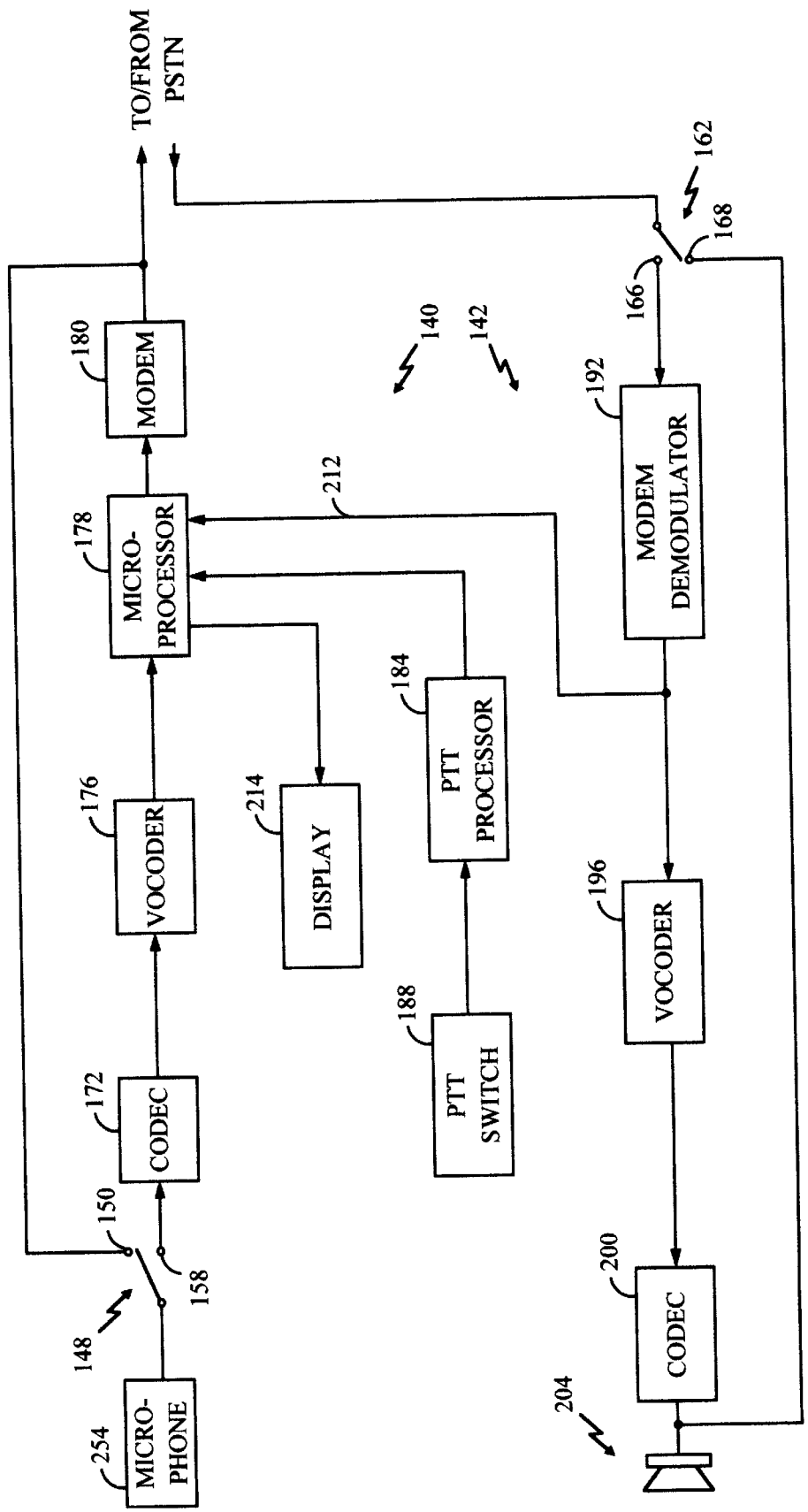
FIG. 3A shows a block diagram of a land line PTT dual-mode telephone comprised of a transmit section and a receive section.

Referring now to FIG. 3A, a block diagram is shown of a land line PTT dual-mode telephone comprised of a transmit section 140 and a receive section 142. The transmit section 140 of dual-mode telephone of FIG. 3A is configured for standard telephone operation when input switch 148 is thrown to pole 150, thereby coupling input microphone 154 to the PSTN 10. The input switch 148 is thrown to pole 158 when it is desired to configure the transmit section 140 for PTT operation within a PTT private network. Similarly, the receive section 142 is set for standard telephone operation when receive switch 162 is thrown to pole 168, and is set for PTT operation when receive switch 162 is thrown to pole 166.

During PTT operation, voice information from microphone 154 is coupled by switch 148 to a codec 172. The codec 172 is disposed to transform this analog voice information, or data information from a peripheral device (not shown) coupled to switch 148, into a pulse code modulated (PCM) waveform provided to a vocoder 176. In an exemplary embodiment the vocoder 176 is realized in conformance with EIA/TIA standard IS-96A, and operates to convert the input PCM waveform into a sequence of vocoder data packets. These vocoder data packets are supplied to a first input of a microprocessor 178, which also has a second input coupled to a PTT processor 184 and an output coupled to a modem 180. When a PTT switch 188 is engaged by the associated member user, the PTT processor 184 provides PTT data packets to the second input of the microprocessor 178. The microprocessor 178 then interleaves the PTT data packets with the vocoder data packets and provides the result to modem 180, which becomes synchronized with one of the network manager modems 98 during PTT operation. Although the PTT processor 184 is depicted as being functionally distinct from the microprocessor 178, both of these functional elements may be incorporated within a single microprocessor unit.

The receive section 142 includes a modem demodulator 192, which also becomes synchronized with a companion network manager modem 98 within the network call manager 40 during PTT mode operation. The vocoder data packets generated by the second modem 192 in response to forward link information from its companion network manager modem 98 are provided to a receive section IS-96A vocoder 196, which in turn produces a PCM signal from the received vocoder data packets for use by a receive section codec 200. The analog output from the codec 200 is then applied to a conventional telephone speaker 204. It should be noted that the functions performed by codecs 172 and 200 may be performed by a single device. Similarly the encoding function of vocoder 176 may be combined with the decoding function of vocoder 196 in a single device.

As is indicated by FIG. 3A, certain information received from the network manager unit 40 by the receive section 142 may be provided to microprocessor 178 via signal line 212. This information may include various network status data (e.g., identities of other participating member users, currently active member user) to be provided by the microprocessor 178 to a conventional display 214 (e.g., LCD screen).

Figure 3B:
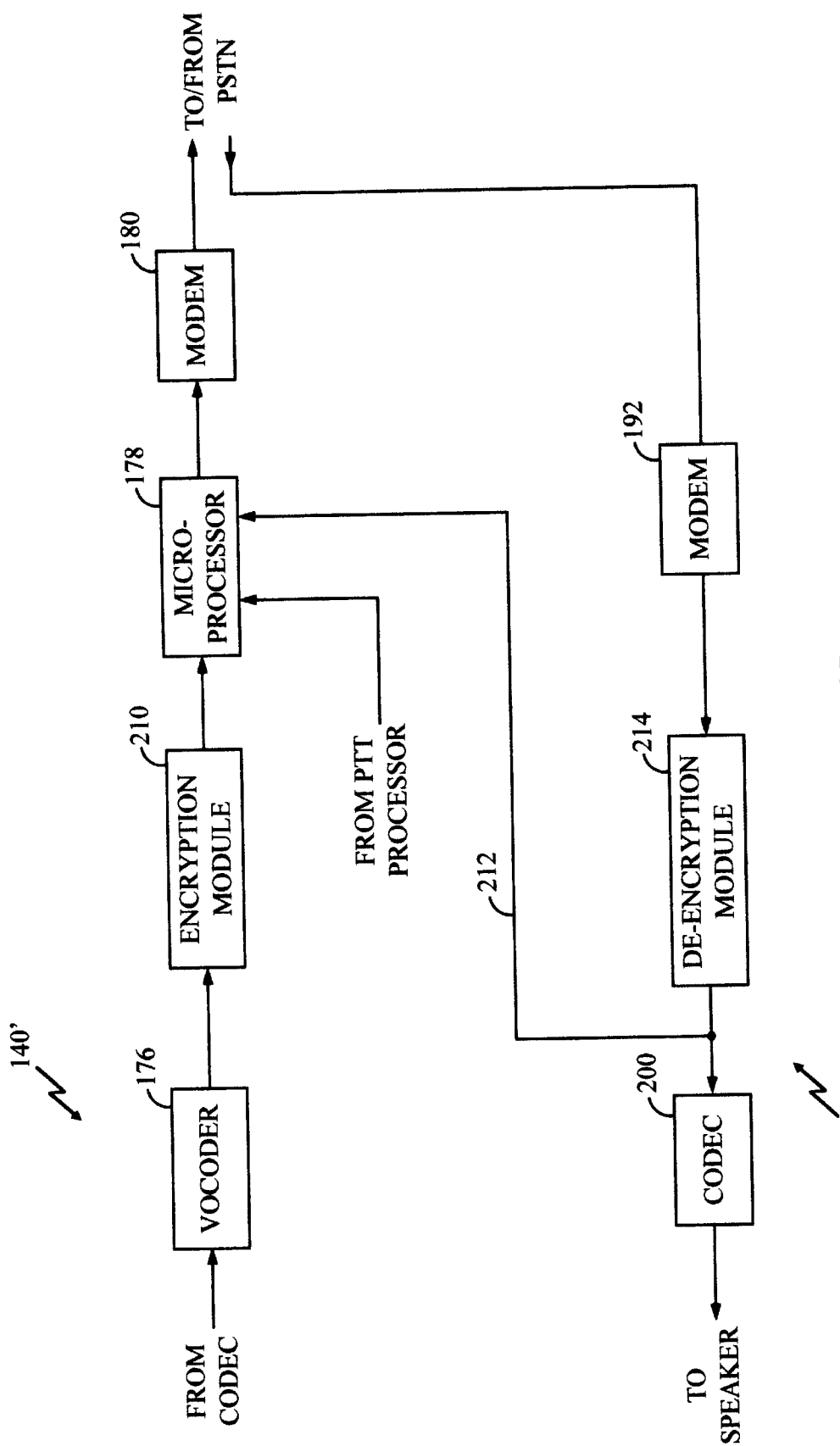
FIG. 3B depicts the land line dual mode PTT telephone of FIG. 3A as modified to facilitate encrypted communication within a PTT private network.

FIG. 3B depicts the land line dual mode PTT telephone of FIG. 3A as modified to facilitate encrypted communication within a PTT private network. Specifically, an alternate transmit section 140' for the telephone of FIG. 3A includes an encryption module 210 interposed between the IS-96A vocoder 176 and the microprocessor 178. In an exemplary embodiment the encryption module 210 operates to encrypt the vocoder data packets in accordance with an industry standard algorithm such as, for example, the Data Encryption Standard (DES). Similarly, an alternate receive section 142' is seen to include a decryption module 214 for removing encryption from the vocoder data packets produced by the second modem 192. It should again be noted that the functions performed by codecs 172 and 200 may be performed by a single device. Similarly the encoding function of vocoder 176 may be combined with the decoding function of vocoder 196 in a single device. Furthermore the functions of encryption module 210 and decryption module 214 may also be combined into a single device. The land line and cellular telephones associated with all of the member users of a given PTT private network capable of participating in encrypted communication will be similarly configured with encryption and decryption modules of like type.

When the user of the land line telephone of FIG. 3B has been designated as the currently active member user, the microprocessor 178 will generate an encryption identification number (I.D.) for transmission to the network call manager 40. The encryption I.D. is associated with a particular "key" used in decryption of the encrypted information produced by the encryption module 210. The network call manager 40 multicasts the encryption I.D. to each of the telephones associated with the remaining non-active (i.e., non-speaking) member users, each of which includes a decryption module similar to the decryption module 214. Each decryption module will typically include a look-up table identifying the decryption key associated with each encryption I.D. Each non-active member user is thus able to decrypt the encrypted information from the currently active member user upon receipt of the encryption I.D. provided thereby.

Figure 4:
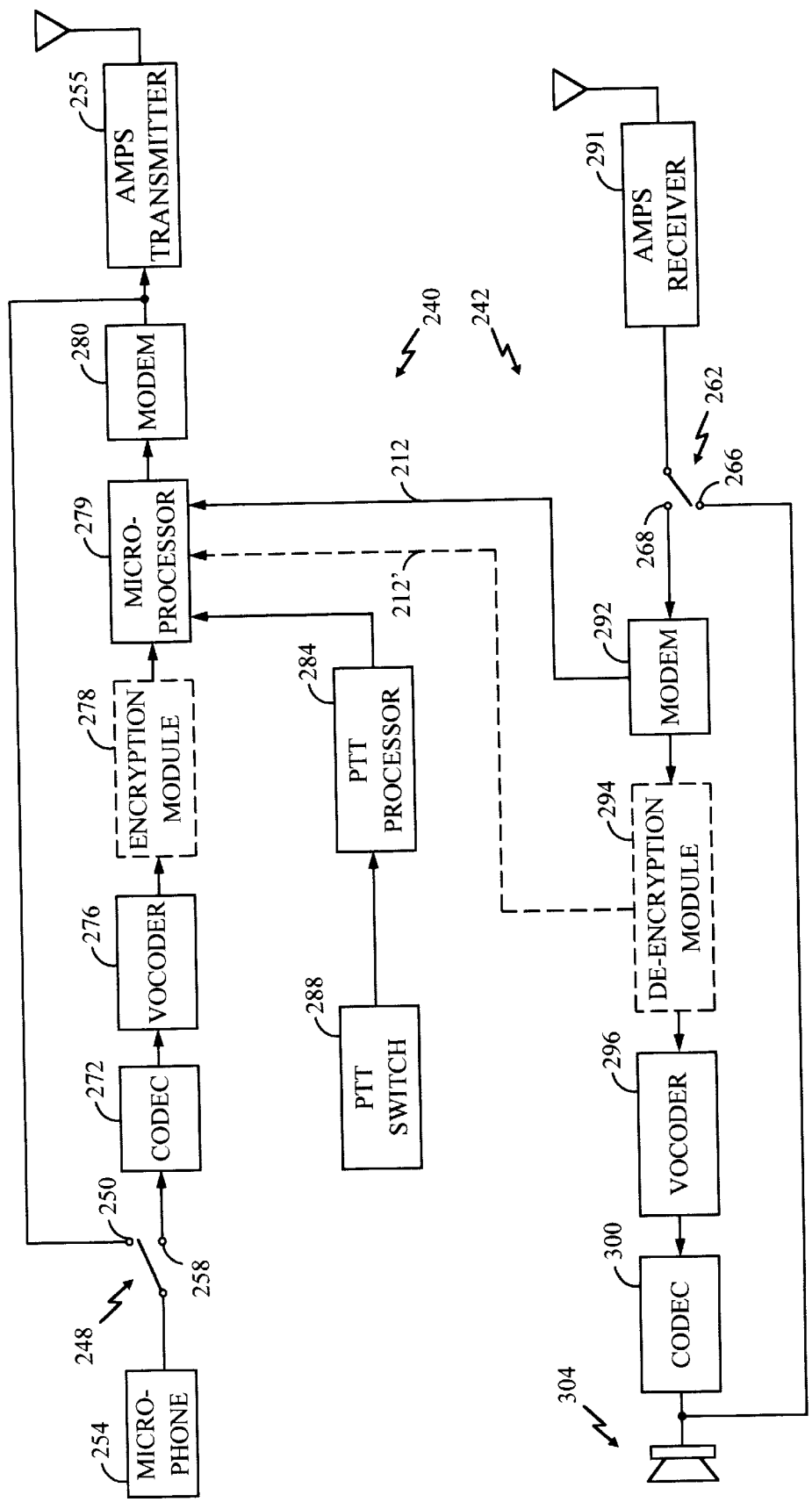
FIG. 4 is a block diagram of an AMPS dual-mode PTT telephone.

Turning now to FIG. 4, a block diagram is provided depicting an AMPS dual-mode PTT telephone comprised of a transmit section 240 and a receive section 242. The transmit section 240 of the AMPS dual-mode PTT telephone of FIG. 4 is configured for standard telephone operation when input switch 248 is thrown to pole 250, thereby coupling input microphone 254 to the an AMPS transmitter 255. The input switch 248 is thrown to pole 258 when it is desired to configure the transmit section 240 for PTT operation within a PTT private network. Similarly, the receive section 242 is set for standard telephone operation when receive switch 262 is thrown to pole 266, and is set for PTT operation when receive switch 262 is thrown to pole 268.

During PTT operation, voice information from microphone 254 is coupled by switch 248 to a codec 272. The codec 272 is disposed to transform this analog voice information into a pulse code modulated (PCM) waveform provided to an IS-96A vocoder 276. The resultant vocoder data packets may then optionally be encrypted by an encryption module 278. When encryption is not desired, the vocoder data packets are supplied to a microprocessor 279 for interleaving with PTT packets from a PTT processor 284. Again, PTT packets are generated by PTT processor 284 in response to engagement of the PTT switch 288. The resulting interleaved vocoder data and PTT packets are then processed by a transmit path modem 280 and provided to the AMPS transmitter 255 for transmission to the AMPS base station 70 or 72. In an alternate embodiment, data information from a peripheral device (not shown) may be supplied to the encryption module 278 or directly to the microprocessor 279.

The receive section 242 includes an AMPS receiver 291 for receiving forward link information provided by the network call manager 40. The analog output from the AMPS receiver 291 is coupled to a receive path modem 292, which becomes synchronized with a network manager modem 98 during PTT mode operation. The vocoder data packets generated by the receive path modem 292 are provided to a decryption module 294 during periods of encrypted PTT private communication. When encryption is not being effected, the vocoder data packets are processed by a receive section vocoder 296 operative to produce a PCM signal for use by a receive section codec 300. The analog output from the codec 300 is then applied to a conventional telephone speaker 304. When encryption is in effect, private network status information and the like received from the network manager unit 40 is decrypted and provided to microprocessor 178 via signal line 212'.

As was discussed with reference to FIGS. 3A and 3B, it should again be noted that the functions performed by codecs 272 and 300 may be performed by a single device. Similarly the encoding function of vocoder 276 may be combined with the decoding function of vocoder 296 in a single device. Furthermore the functions of encryption module 278 and decryption module 294 may also be combined into a single device.

Figure 5:
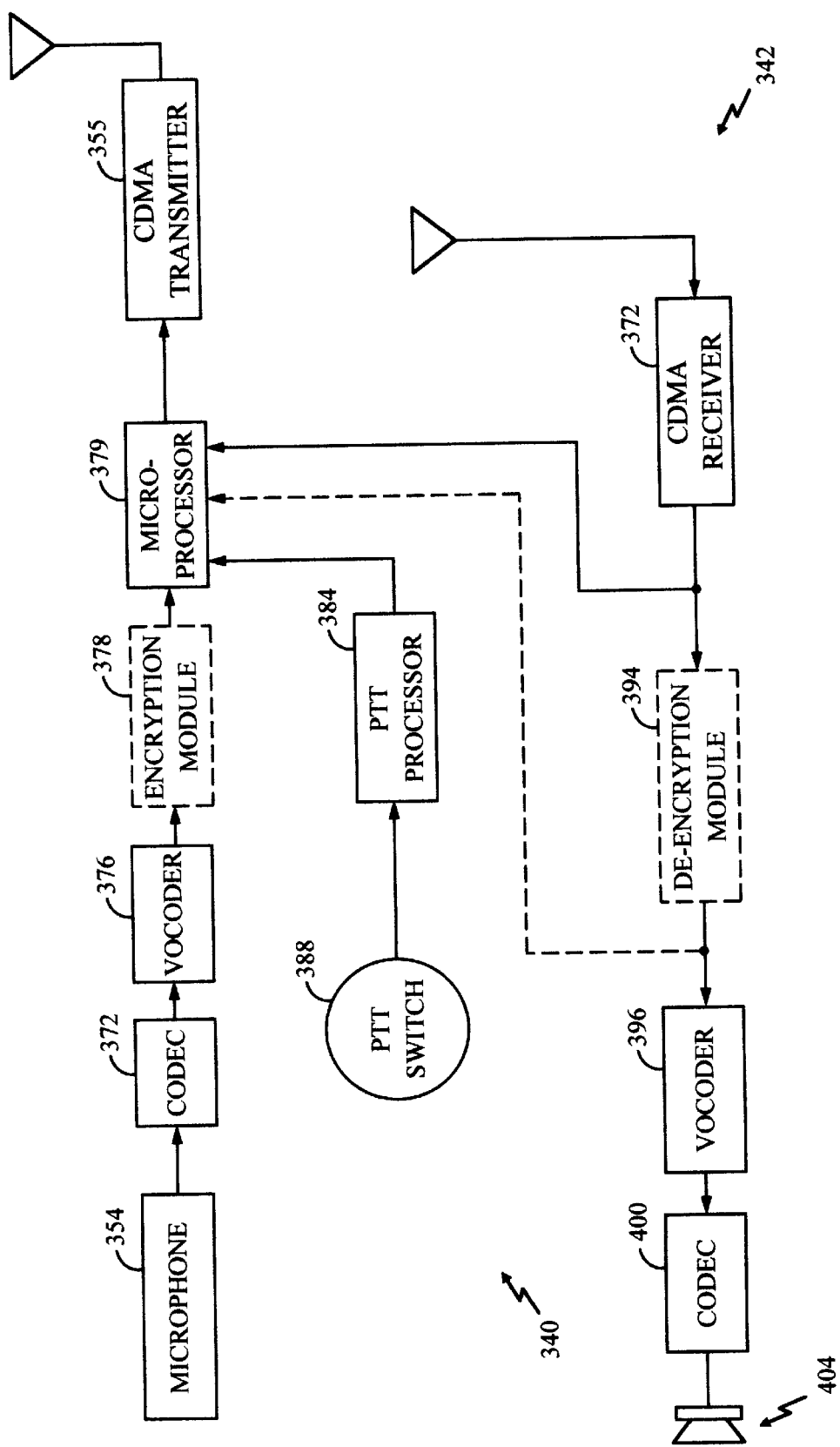
FIG. 5 is a block diagram of an CDMA cellular telephone configured for use within a PTT private network of the present invention.

FIG. 5 provides a block diagram of a CDMA cellular telephone configured for use within a PTT private network. The CDMA cellular telephone of FIG. 5 is comprised of a CDMA transmit section 340 and a CDMA receive section 342. During PTT operation, voice information from microphone 354 is provided to a codec 372 disposed to produce a pulse code modulated (PCM) waveform. The PCM waveform is provided to a vocoder 376, which in turn generates vocoder data packets for optional encryption within an encryption module 378. When encryption is not desired, the vocoder data packets are supplied to a microprocessor 379 for interleaving with PTT packets from a PTT processor 384. Again, PTT packets are generated by PTT processor 384 in response to engagement of the PTT switch 388. The resulting interleaved vocoder data and PTT packets are then provided by the microprocessor 379 to the CDMA transmitter 355.

The CDMA receive section 342 includes a CDMA receiver 392, which generates vocoder data packets in response to forward link information from the network call manager 40. The vocoder data packets are provided to a decryption module 394 during periods of encrypted PTT private communication. When encryption is not in effect, the vocoder data packets are processed by a CDMA receive section vocoder 396 operative to produce a PCM signal for use by a CDMA receive section codec 400. The analog output from the CDMA receive section codec 400 is then applied to a conventional telephone speaker 404. The functions of codecs 372 and 400 may be performed within a single device, as may the functions of vocoders 376 and 396 may also be performed within a single device. Furthermore the functions of encryption module 378 and decryption module 394 may also be combined into a single device.

III. Analog PTT Private Network

Figure 6:
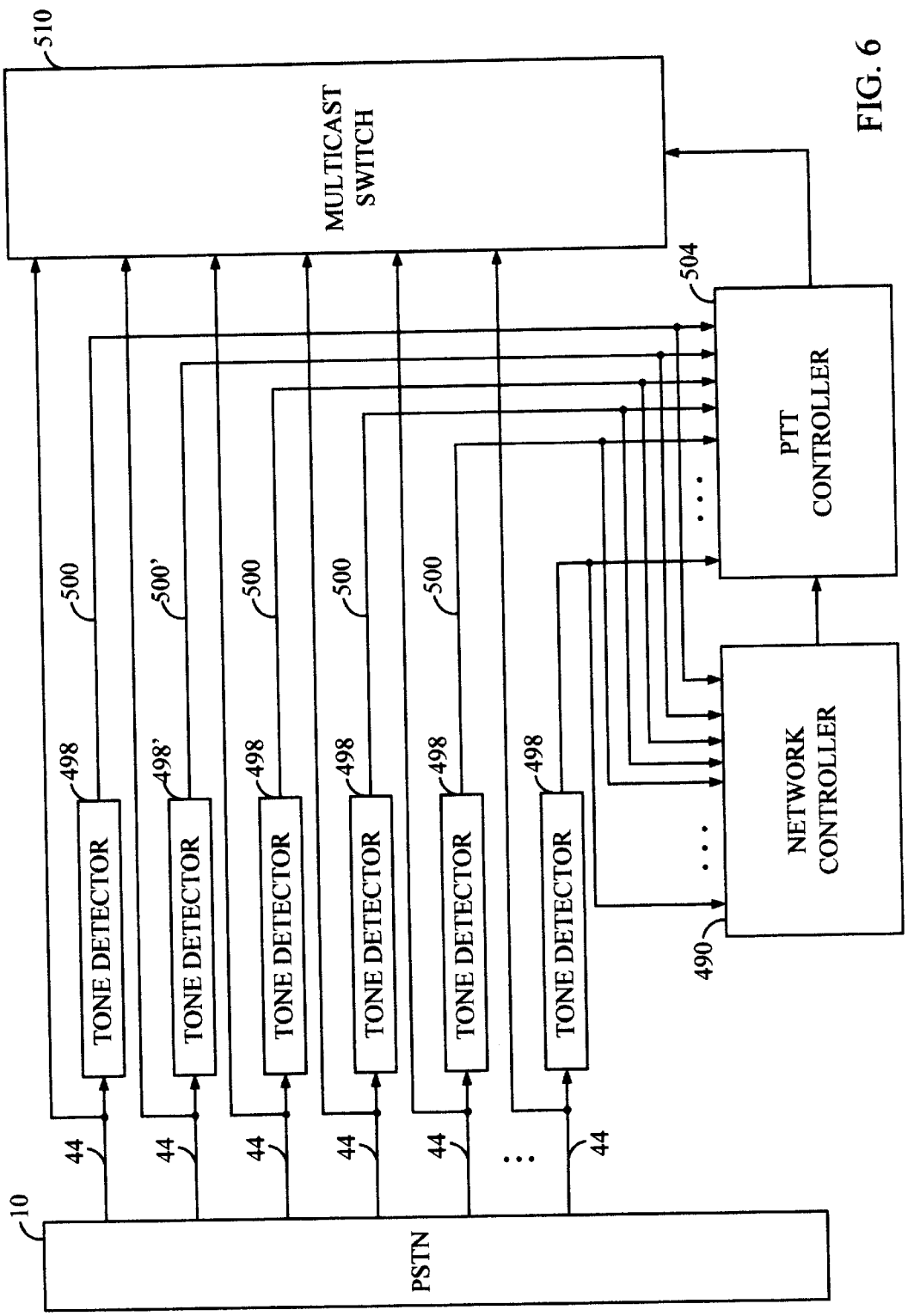
FIG. 6 provides a functional block diagram of a network call manager designed for employment within a PTT private network in which signaling is effected using analog tones.

FIG. 6 provides a functional block diagram of a network call manager 450 designed for employment within a PTT private network in which signaling is effected using analog tones. The network call manager 450 includes a network controller 490, within which is stored one or more lists of the telephone numbers associated with the member users of corresponding PTT private networks. When desiring to access a given PTT private network, a calling member user dials an access number identifying the given PTT private network.

The network call manager 450 is designed to appear to the PSTN 10 as would a private branch exchange (PBX) system, and thus the call placed by the calling member user may be received by the T1 channel 44 associated with any one of a plurality of network manager tone detectors 498. The tone detector 498' receiving the incoming call impresses a detection signal upon its output line 500', which is sensed by the network controller 490. The network controller 490 then begins to scrutinize the tone sequence detected by the called network manager tone detector 498' in order to authenticate the calling PTT user. Once the dialed access number has been recognized by the network controller 490 and the member users of the associated PTT private network identified, the network controller 490 initiates paging of the member users of the identified PTT private network over the remaining T1 channels 44 using standard telephone network procedures. Upon sensing that a first of the other member users of the identified PTT private network answers a network call, the network controller 490 sends a CONNECT signal in the forms of tones to the member user originally dialing the access number of the identified PTT private network —thereby indicating to the calling member user that at least one other member user has joined the identified PTT private network.

A PTT controller 504 is provided for according speaking privileges among the two or more member users joined to the identified PTT private network. In particular, the PTT controller 504 is responsive to PTT request signals, in the form of one or a combination of analog tones ("PTT tone requests"), generated by the telephones associated with the member users of the identified PTT private network. Each PTT tone request is generated at a member user's telephone either in response to manual engagement of a PTT switch, or in response to detected voice activity of the member user. A PTT tone request from a given member user is detected by the tone detector 498 assigned thereto, which then provides a PTT request signal to the PTT controller 504 over one of the output lines 500. In an exemplary embodiment the PTT controller 504 is operative to assign speaking privileges among requesting member users in the manner described above with reference to the PTT controller 104 (FIG. 2).

After a new active member user has been identified by the PTT controller 504 on the basis of the received PTT tone requests, the PTT controller 504 configures a multicast switch 510 to accept the reverse link voice or data information exclusively from the T1 channel 44 associated with the currently active member user. That is, the reverse link information from each of the other T1 channels, each of which has been assigned to one of the remaining (i.e., non-active) member users, is not multicast by the multicast switch 110. The PTT controller 504 also configures the multicast switch 504 to provide the reverse link information accepted from the newly identified active member user to the T1 channels associated with each non-active member user. Because PTT tone requests are transmitted only on the reverse links of non-active member users, such PTT tone requests advantageously do not interfere with the receipt of reverse link information from the active member user.

Although the forward links of each PTT private network are nominally used to carry voice or data information from the active member user to all other member users, the network controller 504 may also transmit system status information over the forward links during pauses or gaps in information transmission by the active member user. In an exemplary embodiment this system status information includes the following:

(i) eligible member users (phone number, name, priority) of a given PTT private network, (ii) member users (phone number, name, priority) currently joined to the given PTT private network, (iii) the currently active member user (phone number, name, priority), and (iv) the queue of member users (phone number, name, priority, order of request) who have provided PTT tone requests to the PTT controller 490.

Such information could be transmitted using sequences of tones or tone combinations capable of being detected within the telephone of each member user. Various PTT private network information (i.e., member user lists, priorities) could be stored within the telephone of each member user, and specific entries retrieved for display upon receipt of the associated tone or tone combination from the network call manager 450. In this regard a land line telephone configured for use within a PTT private network orchestrated by the network call manager 450 is described immediately below with reference to FIG. 7.

Figure 7:
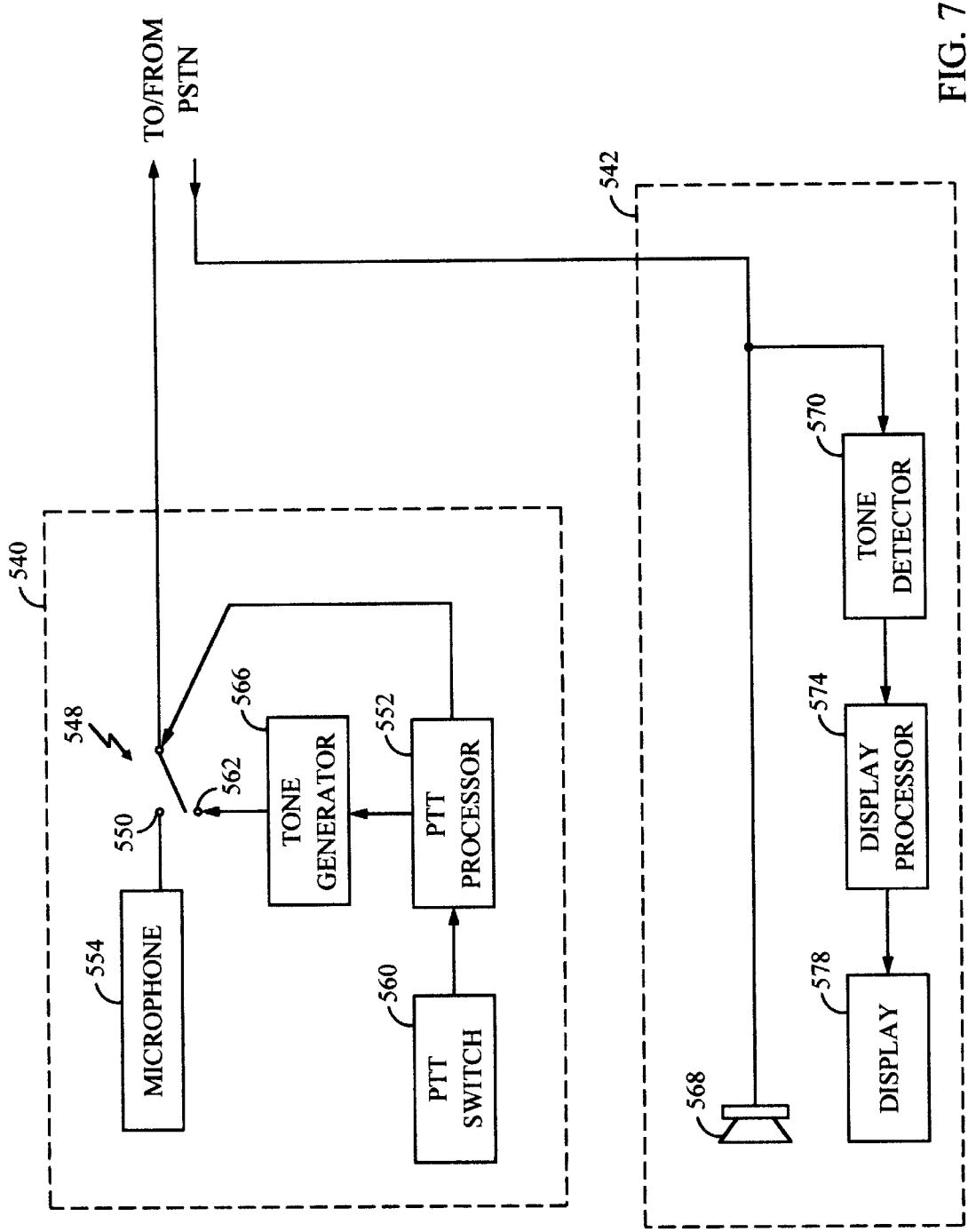
FIG. 7 shows a land line telephone configured for communication with a network call manager using analog tones.

Referring to FIG. 7, a block diagram is shown of a land line PTT telephone having transmit and receive sections 540 and 542 designed for communication using analog tones. During PTT operation, an input switch 548 is nominally set to pole 550 by PTT processor 552 so as to couple voice information from an input microphone 554 to the PSTN. However, when PTT switch 560 is engaged by the associated member user, the PTT processor 552 sets switch 548 to pole 562 and enables a tone generator 566. The allows the PTT tone requests generated by the tone generator 566 to be transmitted via the PSTN to the network call manager 450.

The receive section 542 includes a speaker 568, and an internal tone detector 570 for detecting analog tones or combinations thereof transmitted by the network call manager 450 during PTT mode operation. These tone or tone combinations may be used to convey a variety of status and control information to the PTT telephone of FIG. 7. In an exemplary embodiment this information may include:

(i) identification of the currently active member user (name, priority), (ii) an indication that the member user associated with the PTT telephone has been accorded speaking privileges, (iii) notice that the speaking privileges of the member user associated with the PTT telephone are being revoked in favor of a member user of higher priority, and (iv) identification of the member users currently joined to the PTT private network.

Each tone or tone combination will have associated therewith a character string or other message stored within a display processor 574. In response to each detected tone or tone combination, the display processor 574 provides the associated message to an alphanumeric display 578. The control and status information enumerated above is intended to be merely exemplary, and in alternate embodiments other types of information may be provided to the PTT telephone by the network manager.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a communication system in which users communicate through a switched telephone network, a private communication network for facilitating communication among a plurality of member user telephone sets said private communication network comprising:

a network call manager including:
    a telephone network interface for establishing a telephone connection with each of said plurality of member users over a plurality of channels of said switched telephone network, respectively,
    a switch matrix, coupled to said telephone network interface, for providing an information signal received by said telephone network interface over one of said plurality of channels simultaneously to a plurality of others of said channels via said telephone network interface, and
    a controller for configuring said switch matrix in response to talk request signals received over a selected one of said plurality of channels; and a plurality of eligible member user telephone sets disposed for simultaneous communication over said plurality of channels, each of said eligible member user telephones sets including means for generating one of said talk request signals, at least some of said eligible member user telephone sets being connected to the private communication network through a wireless communications system.

2. The private communication network of claim 1 wherein said controller means including means for identifying said selected one of said plurality of channels by choosing among ones of said talk request signals received over corresponding ones of said plurality of channels.

3. The private communication network of claim 1 wherein a selected one of said plurality of authorized telephone sets includes:

vocoder means for digitally processing input information in order to produce a sequence of vocoder data packets, and modem means for generating said information signal using said vocoder data packets.

4. The private communication network of claim 3 wherein said modem means includes means for multiplexing said talk request signal with said vocoder data packets and for using the result during formation of said information signal.

5. The private communication network of claim 1 wherein said controller means includes means for verifying that said information signal received over said selected one of said plurality of channels was generated by a given one of said plurality of authorized telephone sets.

6. The private communication network of claim 5 wherein said controller means includes means for configuring said telephone network interface to call other ones of said authorized telephone sets subsequent to receipt by said network call manager of said information signal from said given one of said plurality authorized telephone sets.

7. The private communication network of claim 1 further including wireless network means for operatively coupling one of said plurality of authorized telephone sets to a corresponding one of said plurality of channels.

8. The private communication network of claim 1 wherein each of said plurality of authorized telephone set includes means for generating an encrypted signal by encrypting an information signal provided by one of said member users, said encrypted signal being transmitted over a corresponding one of said plurality of channels.

9. The private communication network of claim 8 wherein each of said plurality of authorized telephone sets includes means for recovering one of said information signals from one of said encrypted signals transmitted over a corresponding one of said channels.

10. In a communication system in which users communicate through a switched telephone network, a network call manager for facilitating private communication simultaneously among a plurality of member user telephone sets, at least some of said member user telephone sets being connected to the private communication network through a wireless communications system, said network call manager comprising:

a telephone network interface for establishing a telephone connection with each of a plurality of said member user telephone sets, including at least a plurality of said member user telephone sets that are connected to the private communication network through the wireless communications system, over a corresponding plurality of channels of said switched telephone network;

a switch matrix, coupled to said telephone network interface, for providing an information signal received over a selected one of said plurality of channels simultaneously to other ones of said plurality of channels via said telephone network interface; and controller means for configuring said switch matrix in response to control information received over at least one of said plurality of channels.

11. The network call manager of claim 10 wherein said controller means includes a controller for selecting said selected one of said plurality of channels in response to a talk request signal received over said selected one of said plurality of channels.

12. The network call manager of claim 11 further including wireless network means for establishing communication between at least one of said member users and said switched telephone network.

13. The network call manager of claim 12 wherein said controller means includes arbitration means for choosing said selected one of said plurality of channels on the basis of talk request signals received from ones of said member users over corresponding ones of said plurality of channels.

14. The network call manager of claim 13 wherein said controller means includes means for informing ones of said member users via corresponding ones of said plurality of channels of the identity of a selected member user providing said information signal over said selected one of said plurality of channels.

15. The network call manager of claim 14 wherein said controller means includes means for informing at least one of said member users via a corresponding one of said plurality of channels of the identities of ones of said member users associated with corresponding ones of said plurality of channels.

16. In a private communication network system in which users communicate through a switched telephone network, a method for facilitating private communication among a plurality of eligible member user telephone sets, at least some of said eligible member user telephone sets being connected to the private communication network through a wireless communications system, said method comprising the steps of:

establishing a telephone connection between a network call manager and each of a plurality of telephone channels of said switched telephone network, each of said plurality of telephone channels being associated with one of said plurality of eligible member user telephone sets;

providing an information signal received at said network call manager over a selected one of said plurality of telephone channels from an active one of said eligible member user telephone sets simultaneously to a plurality of other ones of said eligible member user telephone sets over other ones of said plurality of telephone channels;

generating talk request signals substantially simultaneously at a plurality of said eligible member telephone sets for transmission to said network call manager via said switched telephone network; and choosing said active eligible member user telephone set on the basis of said talk request signals received at said network call manager.

17. The method of claim 16 further including the step of identifying said selected telephone channel by choosing among ones of said talk request signals received over corresponding ones of said plurality of telephone channels.

18. The method of claim 16 further including the steps of digitally processing information from said active member user in order to produce a sequence of vocoder data packets for modem transmission to said network call manager.

19. The method of claim 16 further including the step of coupling said information signal from said active member user through a wireless communication network to said selected one of said plurality of telephone channels.

20. The method of claim 16 further including the steps of:
encrypting information signals generated within the one of said plurality of telephone sets associated with said active member user;
transmitting the encrypted information signals to said network call manager; and
decrypting the encrypted information signals received from said network call manager at the ones of said plurality of telephone sets associated with said other ones of said member users.

21. In a communication system in which users communicate through a switched telephone network, a private communication network for facilitating communication among a plurality of member user telephone sets, said private communication network comprising:
a network call manager including:
a telephone network interface for establishing a telephone connection with each of a plurality of telephone lines of said switched telephone network, each of said plurality of telephone lines being associated with one of said plurality of member user telephone sets,
a switch matrix, coupled to said telephone network interface, for providing an information signal received over a selected one of said plurality of telephone lines simultaneously to other ones of said plurality of telephone lines via said telephone network interface, and
controller means for configuring said switch matrix in response to talk request signals received over said plurality of telephone lines; and
a plurality of eligible member user telephone sets, at least some of said eligible member user telephone sets being connected to the private communication network through a wireless communications system, disposed for simultaneous communication over said plurality of telephone lines, each of said eligible member user telephone sets including means for generating one of said talk request signals.

22. The private communication network of claim 21 wherein said controller means including means for identifying said selected telephone line by choosing among ones of said talk request signals received over corresponding ones of said plurality of telephone lines.

\* \* \* \* \*